US012454848B2

(12) United States Patent
Li et al.

(10) Patent No.: US 12,454,848 B2
(45) Date of Patent: Oct. 28, 2025

(54) CHILD-PROOF LOCK

(71) Applicant: Ningbo Eudemon Child Protective Equipment Co., Ltd., Ningbo (CN)

(72) Inventors: Binhui Li, Ningbo (CN); Yingfeng Chen, Ningbo (CN)

(73) Assignee: Ningbo Eudemon Child Protective Equipment Co., Ltd., Ningbo (CN)

( * ) Notice: Subject to any disclaimer, the term of this patent is extended or adjusted under 35 U.S.C. 154(b) by 92 days.

(21) Appl. No.: 18/120,615

(22) Filed: Mar. 13, 2023

(65) Prior Publication Data

US 2023/0212885 A1 Jul. 6, 2023

(30) Foreign Application Priority Data

Dec. 9, 2022 (CN) ........................ 202211583504.1

(51) Int. Cl.
*E05B 65/00* (2006.01)
*E05B 65/06* (2006.01)

(52) U.S. Cl.
CPC .......... *E05B 65/0014* (2013.01); *E05B 65/06* (2013.01)

(58) Field of Classification Search
CPC .. E05B 65/0014; E05B 65/06; E05B 65/0894; E05B 65/462; E05B 67/063; E05B 67/10; E05B 67/18; E05B 67/22; E05B 67/28; E05B 2015/0458; E05B 73/00; E05B 13/00; E05B 2007/007; E05B 19/18; Y10T 70/424; Y10T 70/43; Y10T 70/461; Y10T 70/5097; E05C 7/00; E05C 19/06; E05C 19/08; E05C 19/184; E05C 17/2019; E05C 17/54; B65D 50/00
USPC .......................................... 70/38 R; 292/288
See application file for complete search history.

(56) References Cited

U.S. PATENT DOCUMENTS 1,600,152 A * 9/1926 Szakacs .................. E05B 67/22 70/401
7,121,124 B1 * 10/2006 Whinery ................. E05B 67/24 70/38 C
2012/0255332 A1 * 10/2012 Dubbey ................ E05C 19/003 70/461
2014/0097207 A1 4/2014 Szymiczek et al.
2016/0184534 A1 6/2016 Szymiczek
2016/0311587 A1 10/2016 Schneider et al.

* cited by examiner

*Primary Examiner* — Kristina R Fulton
*Assistant Examiner* — Emily G. Brown

(57) ABSTRACT

The disclosure pertains to a child-proof lock and an unlocking and locking method thereof, the child-proof lock comprises a first lock member and a second lock member, the second lock member is slidably provided on two rod portions of a first rod portion, and the second lock member is displaced outward to disengage from one rod portion, and is then rotated about the other rod portion as an axis of rotation to form an opening for releasing handles for unlocking.

1 Claim, 11 Drawing Sheets

CHILD-PROOF LOCK

TECHNICAL FIELD

The disclosure pertains to the field of child protection articles, and specifically pertains to a child-proof lock that can be used to lock handles of cabinet doors.

BACKGROUND

As a commonly used home product at present, cabinets facilitate people's life, they also bring certain safety issues which are mainly troublesome cleaning and safety hazards resulting from unallowed opening by children. Children are also the most curious, like fresh things, are happy to explore, and may open cabinet doors or drawers during play. Such action may mess up items therein on the one hand, and even cause safety hazards in more serious cases. For example, the items in the cabinet are unsafe for children, corners of the opened cabinets may hurt children, or children may lock themselves in the cabinet.

For example, Chinese invention patent CN205330314U discloses a pull-rod child-proof lock which is designed to have two unlocking buttons and can be unlocked by operating in a predetermined operation mode, which avoids the inconvenience of using a key and can avoid unallowed operation by children. However, the existing child-proof locks are not easy to operate and have single unlocking means.

SUMMARY

The disclosure pertains to a child-proof lock which is easy to operate and has a novel unlocking method.

In one embodiment, a child-proof lock for locking two handles of cabinet doors comprises: a first lock member and a second lock member, when the second lock member is buckled on the first lock member, the two handles of the cabinet doors can be placed in a closed cavity formed therebetween so as to achieve a locking purpose. The second lock member can slide along the first lock member and can be locked at any position in a sliding stroke so as to meet the locking needs of two handles with different spacings. To unlock, the second lock member is slid outward along the first lock member to disengage a seat portion of the second lock member from a rod portion of the first lock member, and the second lock member is rotated about the other rod portion of the first lock member as an axis of rotation to form an opening between the seat portion of the second lock member and the rod portion of the first lock member that have disengaged from each other for releasing the handles for unlocking.

Here, the second locking member is partly disengaged from the first lock member and partly rotated relative to the first lock member for fit, which can be achieved by changing length of corresponding components.

In some cases, the second rod portion and the second seat portion are respectively provided with a first limiting portion and a second limiting portion, so that the second lock member can be limited at a position by limiting fit between the first limiting portion and the second limiting portion after the second lock member moves outward relative to the first lock member, so as to facilitate subsequent rotational unlocking.

Of course, the first limiting portion and the second limiting portion can be separated from each other under a greater force or an additional separation operation so as to completely disengage the second lock member from the first lock member.

In other cases, instead of providing the first limiting portion and the second limiting portion for limiting, the second lock member is held at this position and rotated for unlocking by displacement control of the second lock member by an operator.

In other embodiments, the child-proof lock is unlocked by releasing the handles at an opening formed between the first seat portion and the first rod end to allow the handles to be released through further extension of the second rod portion or the second seat portion rather than releasing the handles through an opening formed by rotation of the second lock member relative to the first lock member.

In one embodiment, the disclosure also provides a method for unlocking and locking a child-proof lock, comprising an unlocking operation and a locking operation.

The unlocking operation comprises: operating the second lock member to be displaced outward relative to the first lock member to a predetermined position so that the second lock member is restrained at the position from further outward displacement relative to the first lock member, disengaging the first seat portion from the first rod portion, and rotating the second seat portion about the second rod portion as an axis of rotation so as to form an opening between the first seat portion and the first rod portion for releasing the handles of the cabinet doors.

The locking operation comprises: operating the second lock member to rotate about the second rod portion as the axis of rotation to an angle aligned with the first lock member, and pushing the second lock member to be displaced inward relative to the first lock member so that the first guide portion is fitted on the first rod portion and displaced therealong until two handles of a cabinet are respectively located at the first locking portion and the second locking portion so as to be locked by the child-proof lock.

The child-proof lock according to the disclosure have the following beneficial effects:

1. In some embodiments, the second lock member is not disengaged from the first lock member in an unlocked state, but the second lock member is rotated along the second rod portion as the axis of rotation relative to the first lock member or the second lock member slides relative to the first lock member to form an opening that allows the handles to be released, thus releasing the locking of the handles by the child-proof lock.

2. In some embodiments, the second lock member can slide within a predetermined length relative to the first lock member and form a locked state at any position within the length, so that the child-proof lock can match cabinet door handles of different specifications for locking.

3. In some embodiments, the first limiting portion and the third limiting portion are provided for one-way locking, and when the second lock member slides inward, the locking of the second lock member can be adjusted without operating the fourth limiting portion.

4. In some embodiments, the fit between the first limiting portion and the second limiting portion prevents the second lock member from being disengaging from the first lock member during daily use, avoiding the need to reposition the second lock member relative to the first lock member during the next locking operation, and the re-locking operation can be accomplished only by resetting the second lock member and then pushing the second lock member to be displaced inward. In other embodiments, operational control may be used in place of structural limiting to realize a child-proof lock having a similar operating mode.

Figure 1:
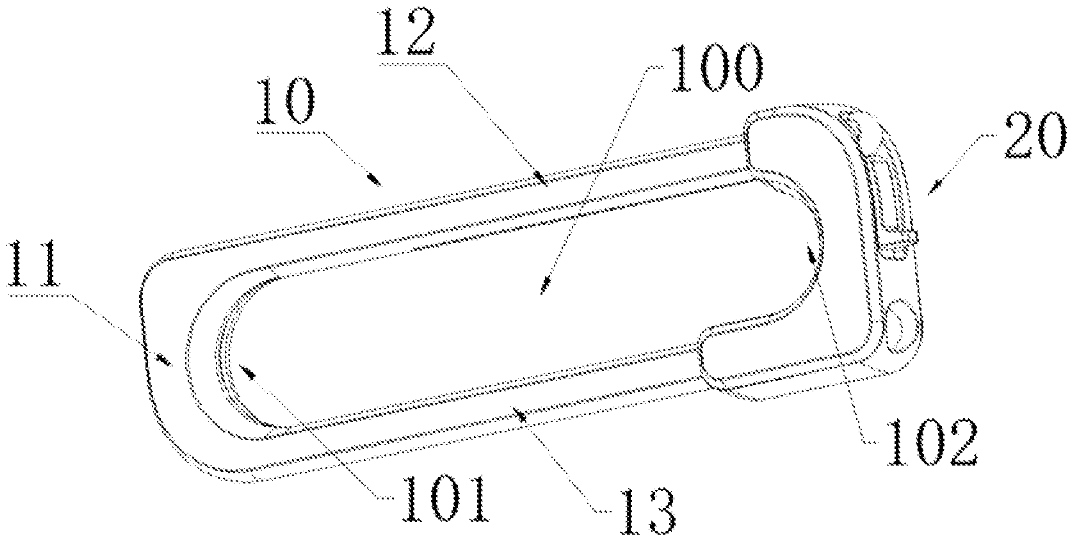
FIG. 1 is a schematic structural view of a child-proof lock according to a first embodiment of the disclosure.

Reference numerals in the drawings: first lock member 10, second lock member 20, bottom rod 11, first rod portion 12, second rod portion 13, third limiting portion 14, first limiting portion 15, first seat portion 21, second seat portion 22, fourth limiting portion 31, second limiting portion 32, cavity portion 100, first locking portion 101, second locking portion 102, opening portion 103, first gap 104, third guide portion 111, fourth guide portion 112, first guide portion 201, second guide portion 202, limiting convex 151, limiting groove 152, first rod end 121, second rod end 131, first actuating portion 311, second actuating portion 312, actuating end 313, tooth block 314, and second gap 315.

DESCRIPTION OF THE EMBODIMENTS

In order to make those skilled in the art better understand the disclosure and thereby define the scope of the disclosure more clearly, the disclosure is described below in detail with respect to some specific embodiments of the disclosure. It should be noted that the following description only describes some specific embodiments of the inventive concept and are only part of the embodiments of the disclosure, specific and direct descriptions of relevant structures are merely for the convenience of understanding the disclosure, and the specific features do not, of course, directly limit the implementation scope of the disclosure. Conventional choices and alternatives made by those skilled in the art under the guidance of the inventive concept should be considered within the scope of the disclosure.

A method for unlocking and locking a cabinet is provided, where an unlocking operation is achieved by outward displacement of a second lock member 20 relative to a first lock member 10 and rotation about a second rod portion 13 as an axis of rotation, so that the second lock member 20 and the first lock member 10 are still connected together rather than being separated from each other in an unlocked state, avoiding loss of components and simplifying an unlocking operation. Locking can be accomplished by the reverse operation of unlocking.

In order to make the second lock member 20 movably arranged without disengaging in the unlocking operation relative to the first lock member 10, two limiting structures which are in concave-convex fit with each other for limiting may be provided, or the second locking piece 20 may be held at a corresponding position by a user operation.

In addition, the locking position between the second lock member 20 and the first lock member 10 is also adjustable so as to be suitable for cabinet doors of different specifications.

The above-described method for unlocking and locking a cabinet can be implemented on the basis of the child-proof lock of the following embodiments.

Embodiment 1

A child-proof lock for locking two handles of cabinet doors is provided to prevent a child from unallowed opening of the cabinet doors to mess up items or create safety issues.

As shown in FIG. 1, the child-proof lock comprises a first lock member 10 and a second lock member 20 in fit with each other to form a racetrack-shaped cavity portion 100, both ends of the cavity portion 100 are respectively formed as a first locking portion 101 and a second locking portion 102, and the two locking portions 101 and 102 are respectively used for providing two handles on the cabinet doors therein so as to lock the cabinet doors. Also, a fitting position of the second lock member 20 relative to the first lock member 10 is adjustable, so that a length of the cavity portion 100 is adjustable to adapt to locking of cabinet doors with different specifications or models. To unlock, the second lock member 20 is driven to be displaced outward relative to the first lock member 10 so as to be completely or partially disengaged from the first lock member 10, so that the cavity portion 100 turns from a closed state to an open state, thus achieving an unlocking purpose.

In the present embodiment, the child-proof lock is configured to be unlocked without complete disengaging of the two lock members.

Figure 2:
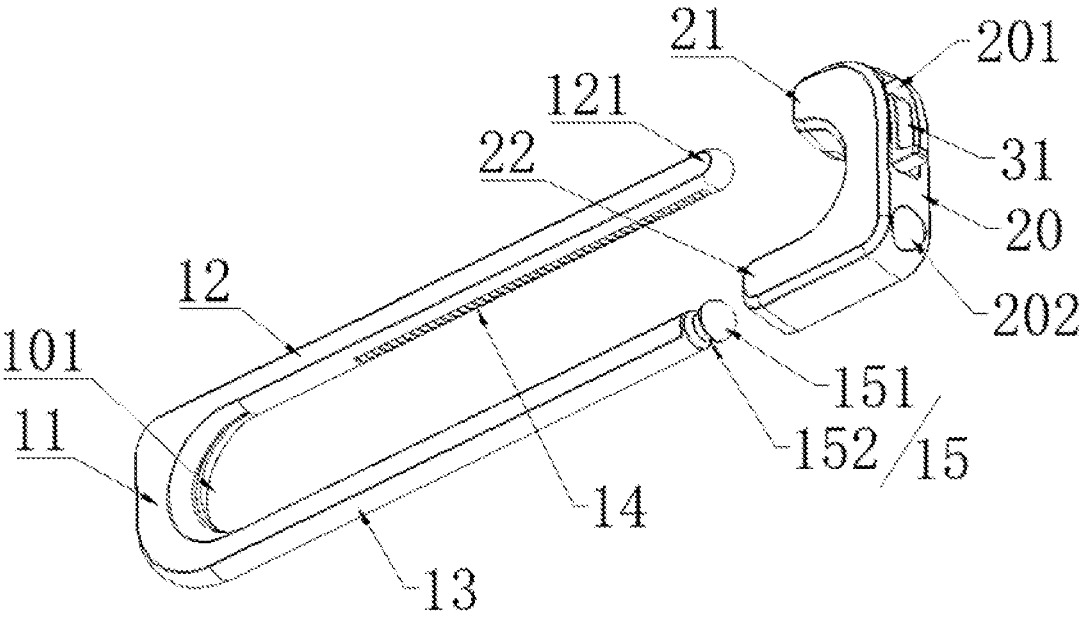
FIG. 2 is a structural exploded view of the embodiment of FIG. 1.
Figure 3:
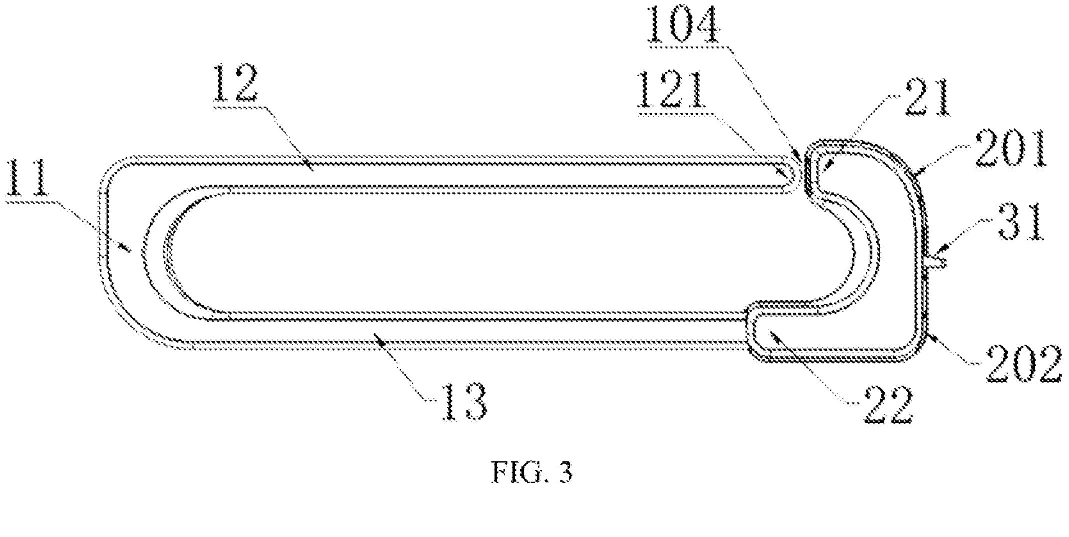
FIG. 3 is a schematic view of an unlocked state of the embodiment of FIG. 1.

As shown in FIG. 2, the first lock member 10 comprises a bottom rod 11, and a first rod portion 12 and a second rod portion 13 connected to both ends of the bottom rod 11 so as to form the first lock member 10 having an overall U-shape. The second lock member 20 has a J-shape, and can be regarded as being formed by extending one end of the U-shape relative to the other end thereof. The first lock member 10 and the second lock member 20 fit each other to form a locked state as shown in FIG. 1, so that the racetrack-shaped cavity portion 100 is formed therebetween, and a circumference of the cavity portion 100 is closed. The cavity portion 100 is used for locking the two handles of the cabinet doors therein, and may have other shapes rather than the one shown in the figure.

In the present embodiment, both ends of the second lock member 20 are respectively formed as a first seat portion 21 and a second seat portion 22, and a length of the second seat portion 22 is greater than that of the first seat portion 21. The first seat portion 21 is provided with a first guide portion 201 therein, and the second seat portion 22 is provided with a second guide portion 202 therein, the first guide portion 201 and the second guide portion 202 are respectively used for fitting on the first rod portion 12 and the second rod portion 13 so as to slide therealong, so that the second lock member 20 can slide along the first lock member 10 to adjust size of the cavity portion 100 (i.e., adjust a distance between the first locking portion 101 and the second locking portion 102), so that the handles provided on two cabinet doors are locked by the first locking portion 101 and the second locking portion 102.

Figure 4:
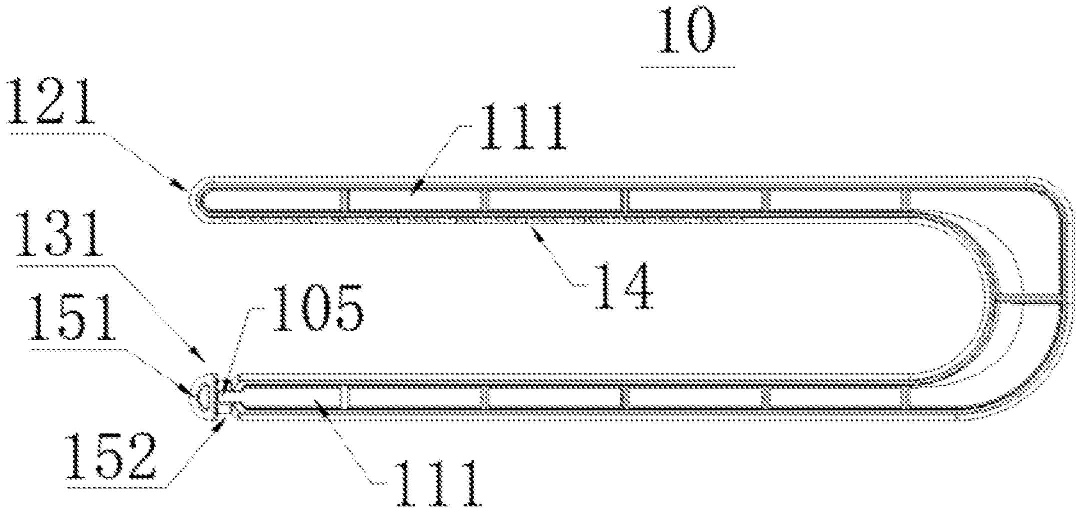
FIG. 4 is a schematic structural view of a back face of a first lock member in the embodiment of FIG. 1.

As shown in FIG. 4, outer ends of the first rod portion 12 and the second rod portion 13 of the first lock member 10 are respectively formed as a first rod end 121 and a second rod end 131, and the first seat portion 21 and the second seat portion 22 are respectively fitted on the first rod end 121 and the second rod end 131 to slide therealong. An opening portion 103 is formed between the first rod end 121 and the second rod end 131.

Figure 5:
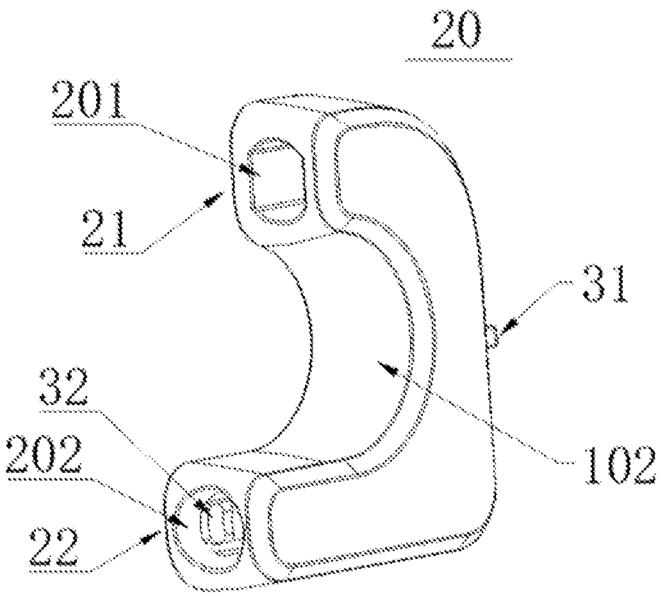
FIG. 5 is a schematic structural view of a front face of a second lock member in the embodiment of FIG. 1.

As shown in FIG. 5, in the present embodiment, the first seat portion 21 and the second seat portion 22 are respectively provided with a first guide portion 201 and a second guide portion 202, and both guide portions are through holes and are sleeved on the first rod portion 12 or the second rod portion 13 to slide along the two rod portions. Of course, in other embodiments, it is also possible to provide the first guide portion 201 or the second guide portion 202 with a shape having a C-shaped cross section, which also enables the second lock member 20 to be slidable but not separable relative to the first lock member 10.

As shown in FIGS. 2 and 4, in the present embodiment, the first rod portion 12 and the second rod portion 13 have substantially equal length. A first limiting portion 15 is also formed at the second rod portion 13, and the first limiting portion 15 comprises a limiting convex 151 and a limiting groove 152, and the limiting groove 152 is smaller than the limiting convex 151 in size so as to form a groove circumferentially or partially circumferentially provided at the second rod end 131.

Figure 6:
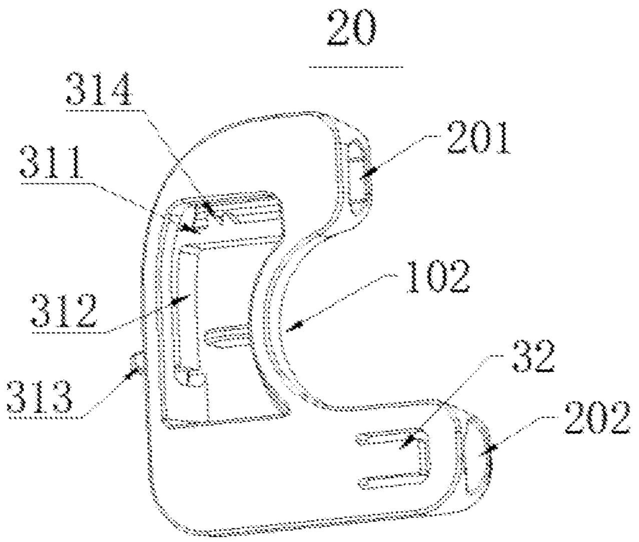
FIG. 6 is a schematic structural view of a back face of the second lock member of FIG. 5.
Figure 7:
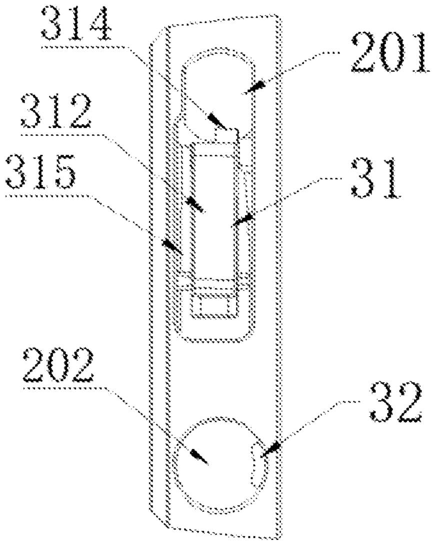
FIG. 7 is a schematic structural view of an outer side of the second lock member of FIG. 5.

As shown in FIGS. 5-7, a second limiting portion 32 in limiting fit with the first limiting portion 15 is provided in the second guide portion 202 of the second seat portion 22, and is formed of a leaf spring, one end of the leaf spring is connected or integrally formed with the second lock member 20, and the other end thereof is free so as to be elastically arranged relative to the second lock member 20. In addition, an inner wall of the leaf spring is also provided with a bump. In the present embodiment, a U-shaped clearance groove is formed between the second limiting portion 32 and the second lock member 20 so as to form the leaf spring and constitute the second limiting portion 32. The second limiting portion 32 formed of the leaf spring may form a limiting relationship in normal use to prevent further displacement of the second lock member 20 relative to the first lock member 10, the leaf spring can be separated from the first limiting portion 15 by a greater pulling force applied by a user to disengage the second lock member 20 from the first lock member 10.

When the second lock member 20 slides outwards relative to the first lock member 10, a bump of the second limiting portion 32 is fitted in the limiting groove 152 and is limited by the limiting convex 151 so as not to release from the second rod portion 13, and at this time, the first seat portion 21 and the first rod end 121 are separated from each other to form a first gap 104, so that the second lock member 20 can rotate relative to the first lock member 10, so that the gap between the first seat portion 21 and the first rod end 121 is increased by the rotation, so that the handle of the cabinet door located at the second locking portion 102 is released. Further operation may also release the other handle from the cavity portion 100, thus removing the child-proof lock from the cabinet door or separating the child-proof lock from the handle of one cabinet door.

Figure 8:
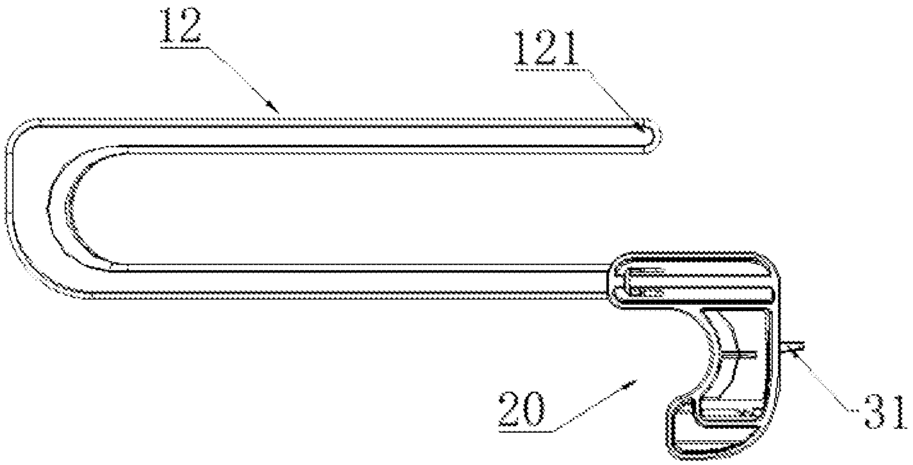
FIG. 8 is a schematic structural view of the child-proof lock of the embodiment of FIG. 1 after rotation of the second lock member.

When the second lock member 20 is rotated by 180°, a state as shown in FIG. 8 is formed, the handles can be released from the child-proof lock to unlock or remove the child-proof lock from the cabinet door, but the second lock member 20 is still fitted on the first lock member 10 without disengaging from each other.

In order to enable the second lock member 20 to be adjustable and locked within a certain range relative to the first lock member 10, the first lock member 10 and the second lock member 20 are respectively provided with a third limiting portion 14 and a fourth limiting portion 31, the third limiting portion 14 is a rack provided along the first rod portion 12, and the fourth limiting portion 31 comprises a tooth block 314 which can be fitted into the rack so as to adjust a relative distance between the two lock members by means of different positions of the tooth block 314 on the rack. In the present embodiment, the fourth limiting portion 31 is provided on an outer side surface of the second lock member 20 to facilitate operation. Of course, in other embodiments, the fourth limiting portion may also be provided on a front face of the second lock member 20, which is also convenient to operate.

As shown in FIGS. 6 and 7, the fourth limiting portion 31 comprises a first actuating portion 311 and a second actuating portion 312, one end of the first actuating portion 311 is connected to the second lock member 20, and the other end thereof is connected to one end (i.e., a first end thereof) of the second actuating portion 312 so as to form the fourth limiting portion 31 having an overall L-shape. Preferably, the fourth limiting portion 31 is integrally formed on the second lock member 20.

In the present embodiment, the tooth block 314 is formed on the first actuating portion 311 and arranged adjacent to the first guide portion 201 so as to be in fit with the third limiting portion 14 arranged on the first rod portion 12. A second end (i.e., the other end opposite to the connected end of the first actuating portion 311) of the second actuating portion 312 is also arranged in an outward convex manner to form an actuating end 313 to facilitate operation of the fourth limiting portion 31. Moreover, a second gap 315 is also formed between the fourth limiting portion 31 and the second lock member 20, so that the fourth limiting portion 31 is relatively movably arranged in the second lock member 20. In an initial case, the tooth block 314 is at a fitting position relative to the first rod portion 12, so that the tooth block 314 is in fit with the third limiting portion 14 to lock the second lock member 20 in at least one direction relative to the first lock member 10. When the fourth limiting portion 31 is operated to displace the tooth block 314 away from the rack, the second lock member 20 is free to slide relative to the first lock member 10.

In the present embodiment, the tooth block 314 is provided with a limiting surface on an outer side thereof and a guide surface on an inner side thereof, while the rack as the third limiting portion 14 is provided with a guide surface on an outer side thereof and a limiting surface on an inner side thereof, and when the second lock member 20 approaches relative to the first lock member 10, the tooth block 314 can slide along the rack through interaction surfaces of the two guide surfaces, and when the two limiting surfaces are relatively moved, when the second lock member and the first lock member move relative to each other, their relative movement can be locked through fit between the two limiting surfaces. Therefore, in the present embodiment, the tooth block and the rack are one-way locking structures, and inward relative movement can be accomplished by pushing, while outward relative movement requires operation to unlock the fourth limiting portion 31. The limiting surfaces are planes arranged perpendicular to an axial direction of the first rod portion, and the guide surfaces are bevel surfaces or curved surfaces.

Of course, in other embodiments, only one of the tooth block and the rack may be provided with a guide surface, which likewise achieves the one-way locking. Alternatively, neither the tooth block nor the rack has a guide surface, and both inward relative movement and outward relative movement require operation of the fourth limiting portion 31 for unlocking.

As shown in FIG. 7, in the present embodiment, a top surface of the bump of the second limiting portion 32 has a concave shape so as to have a good limiting contact therebetween when the bump is fitted in the limiting groove 152 to prevent the second lock member 20 from being accidentally released.

In the present embodiment, a back face of the second rod portion 13 is further concavely provided with a third guide portion 111 for allowing the bump of the second limiting portion 32 to slide therein when the second lock member 20 slides relative to the first lock member 10. In addition, an outer side of the third guide portion 111 is further provided with a fourth guide portion 112 which is formed by a bevel surface or a curved surface to guide when the second limiting portion 32 is fitted into or released from the third guide portion 111. As shown in FIG. 4, the third guide portion 111 also extends into the limiting groove 152 to form a communication groove 105 to facilitate switching of the second limiting portion 32 between the third guide portion 111 and the limiting groove 152.

In the present embodiment, the outer side of the limiting convex 151 is a bevel surface or a spherical surface so as to interact with the bump of the second limiting portion 32 to guide when the disengaged second lock member 20 is fitted relative to the first lock member 10, so that the bump can be fitted in the limiting groove 152 by itself, avoiding the inconvenience of manually operating the bump, and optimizing use experience.

The child-proof lock of the present embodiment works (i.e., a method for unlocking and locking the child-proof lock) as follows:

1. When the second lock member 20 and the first lock member 10 are disengaged from each other, they are two independent components. Corresponding fit between the first seat portion 21 and the first rod portion 12 and between the second seat portion 22 and the second rod portion 13 can make the two fit to form the child-proof lock as a whole.

2. When the handles arranged on two cabinet doors are fitted in the cavity portion 100, the second lock member 20 is moved inward relative to the first lock member 10 by applying a force, and the two handles are locked by the first locking portion 101 and the second locking portion 102, so that the cabinet doors are locked by the child-proof lock. In the process, the tooth block 314 and the rack can be unlocked by themselves during sliding adjustment through guiding effect of the guide surfaces or by operating the fourth limit section 31.

3. To unlock, the fourth limiting portion 31 is operated to release a locking relationship between the tooth block 314 and the rack, and then a force is applied to the second lock member 20 to be displaced outward relative to the first lock member 10 until the first seat portion 21 is completely disengaged from the first rod end 121, at this time, the bump is fitted in the limiting groove 152 to allow the second lock member 20 to rotate about the second rod portion 13 as an axis of rotation, so that a distance between the first seat portion 21 and the first rod end 121 increases to release one of the handles from the cavity portion 100, thus allowing to open the cabinet doors or remove the child-proof lock to from the cabinet doors.

4. In the present embodiment, it is possible to remain the second lock member connected with the first lock member in an unlocked state, avoiding loss of components and simplifying an unlocking operation.

5. To lock, the two handles are firstly placed in the cavity portion 100, and the second lock member 20 is rotated about the second rod portion 13 so that the first seat portion 21 and the first rod end 121 are located at corresponding positions; and a further force is applied to slide the second lock member 20 inward relative to the first lock member 10 until the handles are located at the first locking portion 101 and the second locking portion 102 respectively.

Embodiment 2

Figure 9:
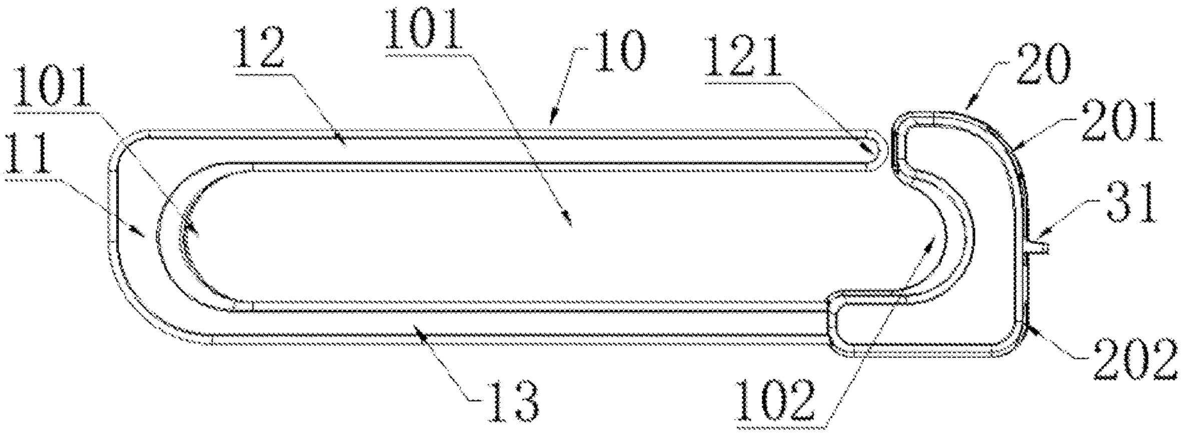
FIG. 9 is a schematic structural view of a child-proof lock in an unlocked state according to a second embodiment of the disclosure.
Figure 10:
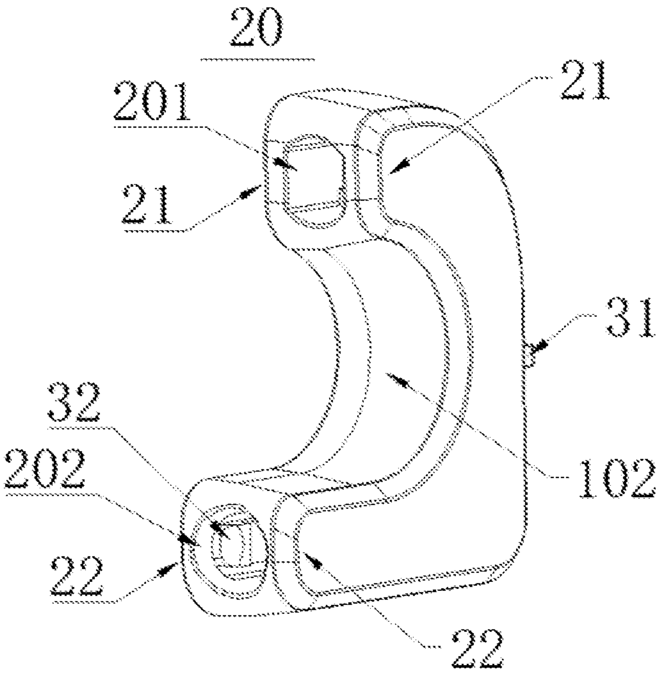
FIG. 10 is a schematic structural view of a second lock member of the embodiment of FIG. 9.
Figure 11:
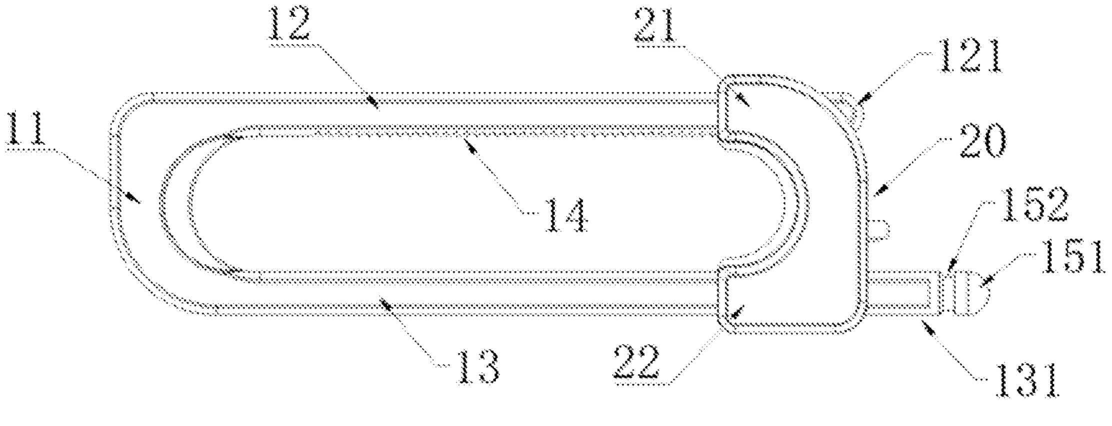
FIG. 11 is a schematic structural view of a child-proof lock according to a third embodiment of the disclosure.
Figure 12:
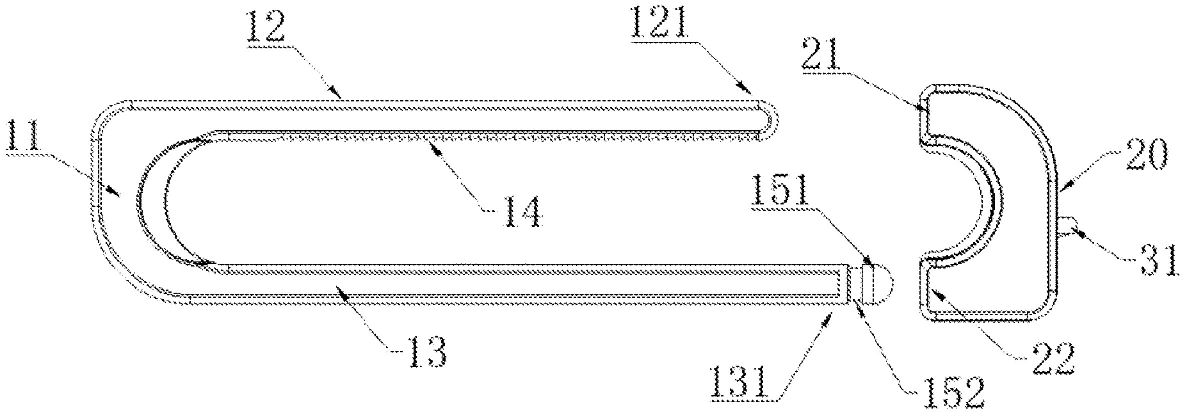
FIG. 12 is a structural exploded view of the embodiment of FIG. 11.
Figure 13:
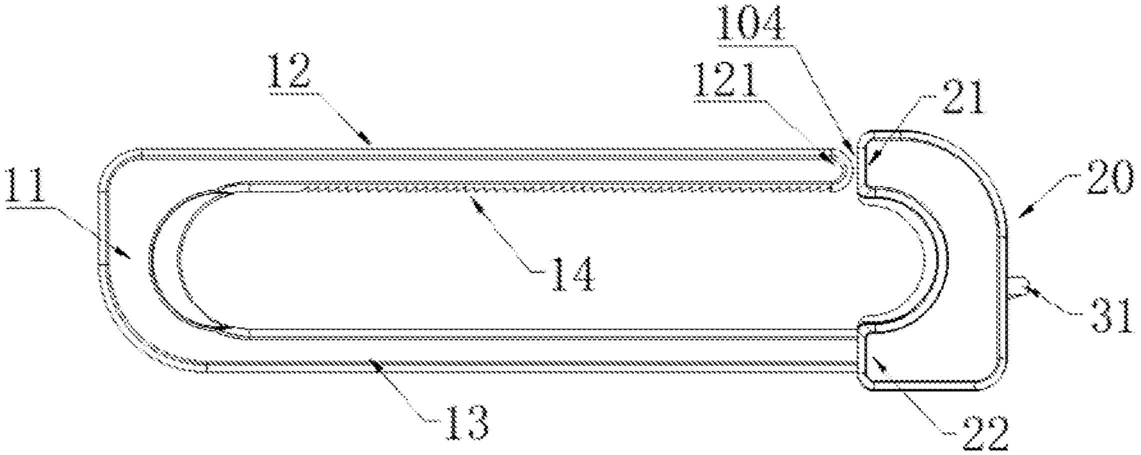
FIG. 13 is a schematic view of an unlocked state of the embodiment of FIG. 11.
Figure 14:
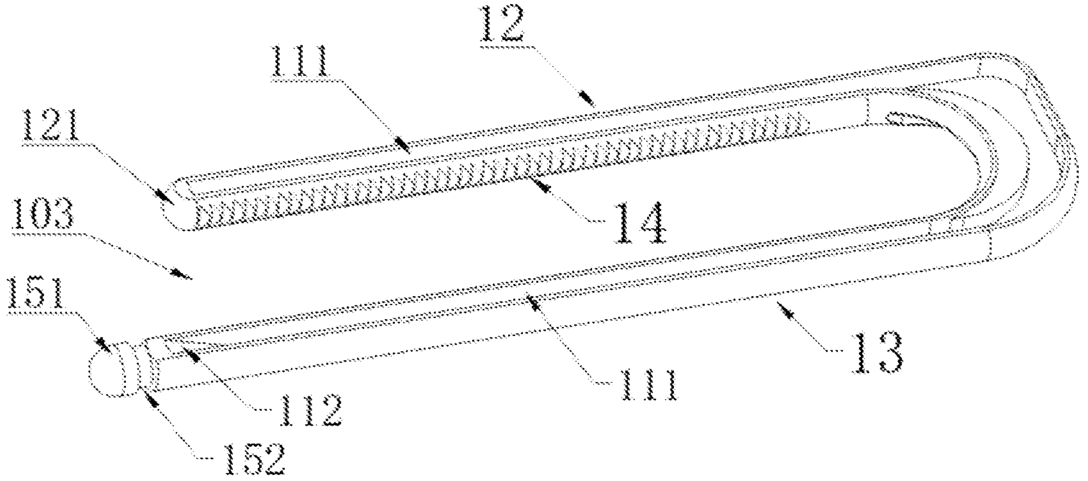
FIG. 14 is a schematic structural view of a first lock member of the embodiment of FIG. 11.
Figure 15:
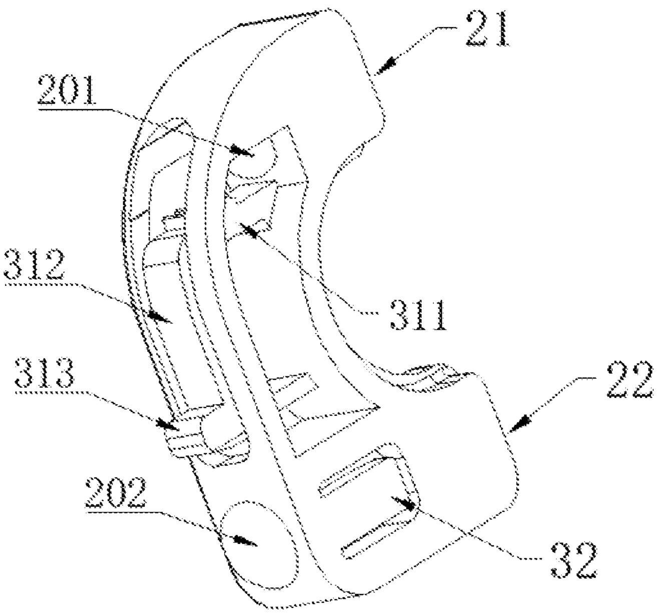
FIG. 15 is a schematic structural view of a second lock member of the embodiment of FIG. 11.

As shown in FIGS. 9-10, a child-proof lock has a main structure the same as that of Embodiment 1, and differs in that: in the present embodiment, the top surface of the bump of the second limiting portion 32 has a flat shape. In the present embodiment, when the bump is in fit with the limiting groove 152, the second lock member 20 is limited relative to the first lock member 10 mainly by fitting a middle portion of the bump in the limiting groove 152, and a fitting force thereof is weaker than that in Embodiment 1 but does not affect function implementation of the child-proof lock, and is advantageous to disassembling the two lock members.

Embodiment 3

As shown in FIGS. 11-15, a child-proof lock has a main structure the same as that of Embodiment 1, and the differences are as follows: in the present embodiment, the second lock member 20 has a U-shape (i.e., the first seat portion 21 and the second seat portion 22 have equal length), while the two rod portions of the first lock member 10 have unequal lengths (i.e., the first rod portion 12 and the second rod portion 13 have unequal lengths, with one being shorter and the other being longer), thereby achieving the purpose of allowing relative rotation for unlocking without disengaging the two lock members similar to that of Embodiment 1.

In the present embodiment, main structures of the first lock member 10 and the second lock member 20 remain unchanged, but the length of the second rod portion 13 is longer than that of the first rod portion 12, and the first seat portion 21 and the second seat portion 22 of the second lock member 20 are arranged to have almost the same length. When the second lock member 20 is slid outward relative to the first lock member 10 until the bump of the second limiting portion 32 is fitted in the limiting groove 152, the first seat portion 21 is disengaged from the first rod end 121, and a first gap 104 is formed therebetween, so that the second lock member 20 is rotated about the second rod portion 13 as an axis of rotation, so that an opening is formed between the first seat portion 21 and the first rod end 121 to allow the handle to be released.

Therefore, the present embodiment differs from Embodiment 1 in different load-bearing structures of the first lock member 10 and the second lock member 20 for realizing relative rotation, and the two embodiments have identical main functional components.

In the present embodiment, since the first seat portion 21 and the second seat portion 22 have identical length, the second lock member 20 may have a square shape.

Embodiment 4

A child-proof lock has a main structure the same as that of Embodiment 1 or 3, and differs in that: in the present embodiment, the first rod portion 12 and the second rod portion 13 of the first lock member 10, and the first seat portion 21 and the second seat portion 22 of the second lock member 20 are arranged to have different lengths correspondingly, with the longer ones among them corresponding to each other, so that after the above-mentioned displacement to a designated position is achieved by the fit between the first lock member 10 and the second lock member 20, the second lock member 20 is allowed to be rotated about the second rod portion 13 as an axis of rotation relative to the first lock member 10 for unlocking.

In other words, in Embodiment 1 or 3, the purpose of post-displacement rotation for unlocking is achieved by extending the length of the second rod portion 13 or the second seat portion 22, and in the present embodiment, the purpose of the post-displacement rotation for unlocking is achieved by jointly extending the length of the second rod portion 13 and the second seat portion 22.

Embodiment 5

Figure 16:
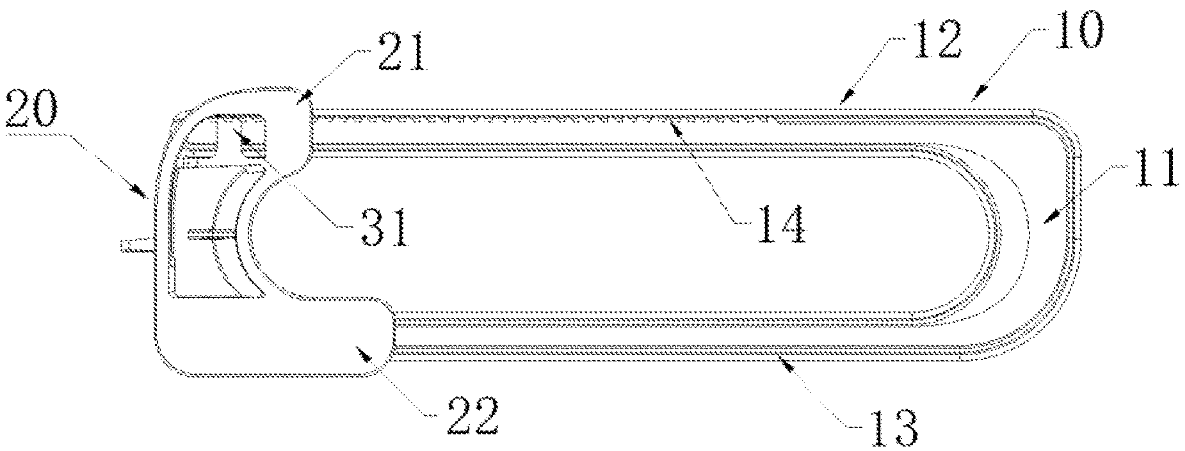
FIG. 16 is a schematic structural view of a back face of a child-proof lock according to a fifth embodiment of the disclosure.

As shown in FIG. 16, a child-proof lock has a main structure the same as that of Embodiment 1, and differs in that: in the present embodiment, the third limiting portion 14 is moved from a position located at a lower end surface of the first rod portion 12 into the first rod portion 12. That is, in the present embodiment, the third limiting portion 14 is arranged at a different position.

Embodiment 6

A child-proof lock has a main structure the same as that of Embodiment 1, 3 or 4, and differs in that: in the present embodiment, the child-proof lock does not have a first limiting portion 15 and a second limiting portion 32.

That is, in the present embodiment, the second lock member 20 can be freely disengaged from the first lock member 10 after being displaced outward relative to the first lock member 10, without being restrained from being disengaged by the interaction between the first limiting portion 15 and the second limiting portion 32 in Embodiment 1, 3 or 4.

The length of the second rod portion 13 relative to the first rod portion 12 and/or the length of the second seat portion 22 relative to the first seat portion 21 may also be present in the present embodiment. Such a structural design makes it possible for the user to limit the second lock member 20 through manual operation at the position where the first seat portion 21 is disengaged from the first rod portion 12 when operating the second lock member 20, so as to achieve the operational effects similar to those described Embodiment 1, 3 or 4. In other words, in the present embodiment, the operating mode of the child-proof lock is similar to that of Embodiment 1, 3 or 4, with the only difference being that in Embodiment 1, 3 or 4, there are limiting structures correspondingly arranged (i.e., the first limiting portion 15 and the second limiting portion 32) for limiting the second lock member 20, while in the present embodiment, there is no such a limiting structure, and the user is required to manually control a displacement amount of the second lock member 20 to achieve the purpose of the same operation mode.

It should be noted that while the second lock member 20 or the first lock member 10 has been described in the above embodiments to have a U-shape, for the child-proof locks of the embodiments, the U-shape is an overall approximate shape and may be varied in detail. For example, in Embodiment 1, the shape between the bottom rod 11 and the first rod portion 12 is approximately a right angle.

Furthermore, in other embodiments, the child-proof lock is unlocked or locked by forming an opening between the first seat portion 21 and the first rod end 121 to allow the handles to be released through further extension of the second rod portion 13 or the second seat portion 22 rather than unlocking by forming an opening by the rotation of the second lock member 20 relative to the first lock member 10.

What is claimed is:

1. A child-proof lock for locking two handles of cabinet doors, comprising:

a first lock member comprising a bottom rod and a first rod portion and a second rod portion disposed at both ends of the bottom rod, and the first lock member has a U-shape; and a second lock member formed as a cavity portion by fitting the first lock member, both ends of the cavity portion being respectively formed as a first locking portion and a second locking portion; the second lock member further comprises a first seat portion and a second seat portion respectively for sliding fit on the first rod portion and the second rod portion, the first seat portion and the second seat portion being respectively provided with a first guide portion and a second guide portion movably arranged along the first rod portion and the second rod portion, and the second rod portion and the second seat portion being respectively provided with a first limiting portion and a second limiting portion;

wherein the first rod portion is provided with a third limiting portion, the first seat portion is provided with a fourth limiting portion, the third limiting portion is a rack, and the fourth limiting portion comprises a tooth block engaged with the rack for adjusting and locking;

the second limiting portion is formed of a leaf spring, one end of the second limiting portion is connected or integrally formed with the second lock member, and the other end thereof is free; and the first limiting portion comprises a limiting convex and a limiting groove, and a bump is provided at the other end of the second limiting portion;

wherein the second lock member is displaced outward relative to the first lock member to disengage the first seat portion from the first rod portion, the bump is snapped in the limiting groove for limiting fit, the second seat portion rotates about the second rod portion as an axis of rotation to form a first gap between the first seat portion and the first rod portion, and the first gap forms an opening for unlocking;

wherein a length of the second seat portion is greater than a length of the first seat portion, and when the first seat portion is displaced to disengage from the first rod portion, the first limiting portion is in limiting fit with the second limiting portion, so that the second seat portion is rotatably fitted on the second rod portion about the second rod portion as the axis of rotation; and/or a length of the second rod portion is greater than a length of the first rod portion, and when the first seat portion is displaced to disengage from the first rod portion, the first limiting portion is in limiting fit with the second limiting portion, so that the second seat portion is rotatably fitted on the second rod portion about the second rod portion as the axis of rotation;

wherein the fourth limiting portion is provided on an outer side surface or a front face of the second lock member, and a second gap is formed between the fourth limiting portion and the second lock member; and a back face of the second rod portion is also concavely provided with a third guide portion, and when the second lock member slides relative to the first lock member, the bump slides in the third guide portion.

* * * * *